(12) United States Patent
Kukkula

(10) Patent No.: US 11,223,440 B2
(45) Date of Patent: Jan. 11, 2022

(54) RADIO COMMUNICATION

(71) Applicant: Nordic Semiconductor ASA, Trondheim (NO)

(72) Inventor: Ilari Kukkula, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/771,156

(22) PCT Filed: Dec. 11, 2018

(86) PCT No.: PCT/GB2018/053593
§ 371 (c)(1),
(2) Date: Jun. 9, 2020

(87) PCT Pub. No.: WO2019/116023
PCT Pub. Date: Jun. 20, 2019

(65) Prior Publication Data
US 2021/0152270 A1  May 20, 2021

(30) Foreign Application Priority Data

Dec. 11, 2017  (GB) ...................................... 1720596

(51) Int. Cl.
*H04J 3/06* (2006.01)
*H04B 1/00* (2006.01)
(Continued)

(52) U.S. Cl.
CPC .......... *H04J 3/0685* (2013.01); *H04B 1/0007* (2013.01); *H04L 7/005* (2013.01); *H04B 1/62* (2013.01)

(58) Field of Classification Search
CPC ........ H03L 7/095; G06F 7/57; G06F 11/3013; H03D 3/24; H04L 7/00; H04W 56/001; H04H 20/65
See application file for complete search history.

(56) References Cited

U.S. PATENT DOCUMENTS 8,405,532 B1  3/2013  Clark et al.
8,442,076 B1  5/2013  Khlat
(Continued)

FOREIGN PATENT DOCUMENTS

EP  2 154 788 A2  2/2010
WO  WO 2014/074356 A1  5/2014

OTHER PUBLICATIONS

IPO Search Report under Section 17(5) for GB1720596.4, dated May 29, 2018, 3 pages.
International Search Report and Written Opinion for PCT/GB2018/053593, dated Feb. 21, 2019, 13 pages.

*Primary Examiner* — Iqbal Zaidi
(74) *Attorney, Agent, or Firm* — Klarquist Sparkman, LLP

(57) ABSTRACT

An electronic device comprises a first circuit portion comprising one or more components, including a first counter, which are clocked by a first clock signal. The first circuit portion is arranged to receive a data stream comprising a plurality of data signals. A second circuit portion comprises one or more components clocked by a second clock signal and a second counter not clocked by the second clock signal. The first clock signal is not synchronised to the second clock signal. The second circuit portion is arranged to: receive samples of the data stream from the first circuit portion at a sample rate and to time-stamp each received sample with a count value of the second counter. The second circuit portion increments the count value of the second counter by a predetermined increment value for each received sample.

19 Claims, 3 Drawing Sheets

(51) Int. Cl.
*H04L 7/00* (2006.01)
*H04B 1/62* (2006.01)

(56) References Cited

U.S. PATENT DOCUMENTS

| | | |
|---|---|---|
| 2009/0055677 A1 | 2/2009 | Chen |
| 2014/0126615 A1 | 5/2014 | Agami et al. |
| 2015/0370678 A1* | 12/2015 | Tufvesson .......... G06F 11/3013 |
| | | 702/186 |
| 2017/0288684 A1* | 10/2017 | Ogihara .................. H03L 7/095 |
| 2018/0115478 A1* | 4/2018 | Kim .................. H04N 21/4305 |

* cited by examiner

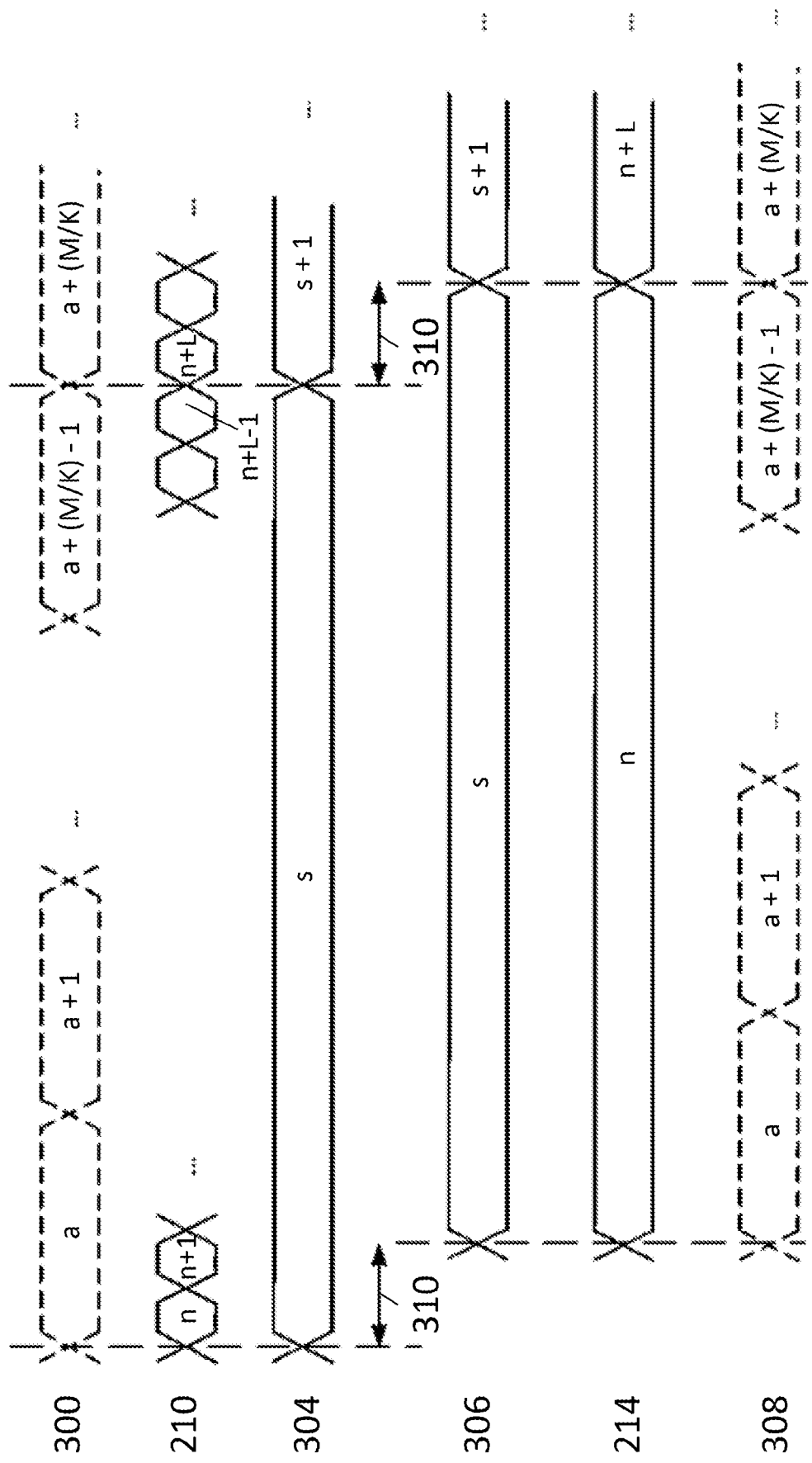

RADIO COMMUNICATION

CROSS REFERENCE TO RELATED APPLICATIONS

This is the U.S. National Stage of International Application No. PCT/GB2018/053593, filed Dec. 11, 2018, which was published in English under PCT Article 21(2), which in turn claims the benefit of Great Britain Application No. 1720596.4, filed Dec. 11, 2017.

TECHNICAL FIELD

The present invention relates to transferring system timing signals over asynchronous interfaces, particularly in electronic devices arranged to carry out radio communications, for example Long Term Evolution (LTE) communications, in particular for Internet of Things applications.

BACKGROUND

Throughout the course of the past few decades, the extent and technical capabilities of cellular-based radio communication systems have expanded dramatically. A number of different cellular-based networks have been developed over the years, including the Global System for Mobile Communications (GSM), General Packet Radio Services (GPRS), Enhanced Data rates for GSM Evolution (EDGE), and Universal Mobile Telecommunications System (UMTS), where GSM, GPRS, and EDGE are often referred to as second generation (or "2G") networks and UMTS is referred to as a third generation (or "3G") network.

More recently, the Long Term Evolution (LTE) network, a fourth generation (or "4G") network standard specified by the 3$^{rd}$ Generation Partnership Project (3GPP), has gained popularity due to its relatively high uplink and downlink speeds and larger network capacity compared to earlier 2G and 3G networks. More accurately, LTE is the access part of the Evolved Packet System (EPS), a purely Internet Protocol (IP) based communication technology in which both real-time services (e.g. voice) and data services are carried by the IP protocol. The air interface of LTE is often referred to as Evolved UMTS Terrestrial Radio Access (or "E-UTRA").

However, while "classic" LTE connections are becoming increasingly prevalent in the telecommunications industry, further developments to the communication standard are being made in order to facilitate the so-called "Internet of Things" (IoT), a common name for the inter-networking of physical devices, sometimes called "smart devices", providing physical objects that may not have been connected to any network in the past with the ability to communicate with other physical and/or virtual objects. Such smart devices include: vehicles; buildings; household appliances, lighting, and heating (e.g. for home automation); and medical devices. Such smart devices are typically real-world objects with embedded electronics, software, sensors, actuators, and network connectivity, thus allowing them to collect, share, and act upon data. These devices may communicate with user devices (e.g. interfacing with a user's smartphone) and/or with other smart devices, thus providing "machine-to-machine" (or "machine type") communication. However, the development of the LTE standards makes it more practical for them to connect directly to the cellular network.

3GPP have specified two versions of LTE for such purposes in Release 13 of the LTE standard. The first of these is called "NarrowBand IoT" (NB-IoT), sometimes referred to as "LTE Cat NB1", and the second is called "enhanced Machine Type Communication" (eMTC), sometimes referred to as "LTE Cat M1". It is envisaged that the number of devices that utilise at least one of these standards for IoT purposes will grow dramatically in the near future.

From a communications perspective, LTE standards (including NB-IoT and eMTC) use orthogonal frequency division multiple access (OFDMA) as the basis for allocating network resources. This allows the available bandwidth between to be shared between user equipment (UE) that accesses the network in a given cell, provided by a base station, referred to in LTE as an "enhanced node B", "eNodeB", or simply "eNB". OFDMA is a multi-user variant of orthogonal division multiplexing (OFDM), a multiplexing scheme in which the total bandwidth is divided into a number of non-overlapping sub-bands, each having its own sub-carrier frequency. In OFDM, unlike other frequency division multiplexing (FDM) schemes, each of these sub-carriers are orthogonal to one another such that cross-talk between sub-bands is ideally eliminated and removing the need for inter-carrier guard bands.

Within an electronic device, there are typically several entities (e.g. subsystems of the device) that are not necessarily synchronised to one another. In other words, each entity has its own internal timer, which is usually implemented using a counter. Each of these counter-based timers is arranged to try and keep track of the system time. In LTE, this system time is a clock that runs at 30.72 MHz. The different entities are separated by an asynchronous interface, for example a power domain crossing and/or a clock domain crossing.

In order to attempt to ensure that both entities have the same internal reference to the system time, typically synchronisation signals are passed from one entity to the other. For example, in a radio receiver, one entity might be a radio frequency (RF) front-end circuit portion and another entity might be a baseband (BB) circuit portion, where both the RF and BB circuit portions have their own internal clocks. The RF front-end is typically arranged to send a timing event signal to the BB circuit portion via a synchroniser such that the BB circuit portion can capture the timing event and set its own counter-based timer to the same value as the timer of the RF circuit portion.

However, the Applicant has appreciated that passing signals over an asynchronous interface introduces uncertainty which is not desirable. The degree of uncertainty depends on, inter alia, the clock rates of the entities that transmit and receive the timing event signal and on the specific synchroniser being used.

SUMMARY OF THE INVENTION

When viewed from a first aspect, the present invention provides an electronic device comprising:
    a first circuit portion comprising one or more components, including a first counter, which are clocked by a first clock signal, wherein the first clock signal has a first frequency, said first circuit portion being arranged to receive a data stream comprising a plurality of data signals; and
    a second circuit portion comprising one or more components clocked by a second clock signal having a second frequency and a second counter not clocked by the second clock signal, wherein the first clock signal is not synchronised to the second clock signal;
    wherein the second circuit portion is arranged to:
    receive samples of the data stream from the first circuit portion at a sample rate;

time-stamp each received sample with a count value of the second counter; and increment the count value of the second counter by a predetermined increment value for each received sample from the data stream.

This first aspect of the invention extends to a method of operating an electronic device which comprises:

a first circuit portion comprising one or more first circuit components, said one or more first circuit components including a first counter; and a second circuit portion comprising one or more second circuit components and a second counter;

the method comprising:

clocking the first circuit components by a first clock signal, wherein the first clock signal has a first frequency, clocking the second circuit components but not the second counter by a second clock signal having a second frequency, wherein the first clock signal is not synchronised to the second clock signal;

said first circuit portion being receiving a data stream comprising a plurality of data signals;

said second circuit portion receiving samples of the data stream from the first circuit portion at a sample rate;

time-stamping each received sample with a count value of the second counter; and incrementing the count value of the second counter by a predetermined increment value for each received sample from the data stream.

Thus it will be appreciated by those skilled in the art that embodiments of the present invention provide an electronic device with two asynchronous circuit portions, representing two different clock domains, where the second circuit portion can maintain certainty over its timing without the need for dedicated synchronisation signals from the first circuit portion. Instead the second circuit portion uses the arrival time of the samples to keep track of the system time and to time-stamp the received samples.

In accordance with this elegant approach, the second counter may therefore maintain its previous value until the second circuit portion receives and time-stamps a sample from the first circuit portion, at which time it may increment its count value by the increment value. This leads to the second counter having 'coarser' timing than the first counter, however this is not of detriment where, as is preferred, the second counter's count value is only used by the second circuit portion for time-stamping the samples it receives, and thus the timings correspond accurately to those in the first circuit portion.

The acquisition and maintenance of the timing within the second circuit portion is agnostic to any variations in transfer latency that are introduced by the asynchronous interface between the first and second circuit portions. Any operations, for example receiver operations including sampling buffer switches, or starting and stopping the sampling process, may then be timed based on the count values of the second counter.

The predetermined increment value by which the second counter increments its count value could be any suitable count value, and those skilled in the art will appreciate that the choice of predetermined increment value will simply determine the conversion factor(s) that should be applied in order to 'translate' the time-stamp for a given sample into the time base of the first circuit portion, second circuit portion, and/or system time.

In some embodiments, however, the predetermined increment value is a ratio between the second clock frequency and the sample rate. In other words, dividing the second clock frequency by the sample rate yields the number of ticks of the second clock that occur during a single sample period and thus causes the second counter to 'jump' to the count value that it would have reached had it been running normally, clocked by a clock signal synchronised to the first clock signal. Thus, in accordance with such embodiments, the second circuit portion increments its own counter based on incoming samples by making use of the known second clock frequency and the known sampling rate, which may also provide the advantage that there is no need for the second clock frequency to be the same as the first clock frequency.

Typically, the second clock frequency is not equal to the sample rate and thus, in at least some such embodiments, the ratio is not 1:1. For example, in at least some embodiments, the second clock frequency is greater than the sample rate such that the ratio is greater than 1:1.

The time-stamps applied by the second counter may still give accurate values measured in the second clock but synchronised to the first clock. The time-stamps produced by the second circuit portion are, in such embodiments, in the time base of the second clock domain, however these can be translated into the time base of the first circuit portion by multiplying the time-stamps by a conversion factor equal to a ratio between the first clock frequency and the second clock frequency.

In an alternative set of embodiments, the predetermined increment value is a ratio between the first clock frequency and the sample rate. In other words, dividing the first clock frequency by the sample rate yields the number of ticks of the first clock that occur during a single sample period. Incrementing the second counter by this value may advantageously mean that the time-stamps provided by the second circuit portion (using the count value of the second counter) are in the time base of the first circuit portion, without needing to transfer any information regarding the first clock signal across the asynchronous interface between the respective clock domains of the first and second circuit portions. These time-stamps can be translated from the time base of the first circuit portion into the time base of the second circuit portion by multiplying the time-stamps by a conversion factor equal to a ratio between the second clock frequency and the first clock frequency.

Typically, the first clock frequency is not equal to the sample rate and thus, in at least some such embodiments, the ratio is not 1:1. For example, in at least some embodiments, the first clock frequency is greater than the sample rate such that the ratio is greater than 1:1.

In some embodiments, the electronic device comprises memory having a plurality of memory locations, wherein the second circuit portion is arranged to store each incoming sample from the data stream into the memory such that each sample is stored at the next consecutive memory location. Those skilled in the art will appreciate that the term 'next consecutive memory location' as used herein means the next memory location in the order in which memory locations are accessed from the beginning to the end of the available memory locations; while this is typically the next physical memory location, in some memory arrangements there may be a logical mapping of memory locations that is not necessarily commensurate with the physical order of the memory locations. By storing the samples in this way, the storage address used for any given sample are directly related to a specific count value of the second counter.

While the memory may be of any type suitable for the storage of the samples, in a set of embodiments the device further comprises a processing circuit portion that comprises the memory and a processor arranged to access said memory. Those skilled in the art will appreciate that, this may be implemented using memory based on the same chip as the processor, often referred to as 'tightly coupled memory' (TCM).

It will be appreciated that the principle of the present invention may readily be applied to any type of electronic device having an asynchronous interface between different circuit portions. However, the Applicant has appreciated that the principles of the present invention are particularly applicable to radio receiver devices and in some embodiments, the first circuit portion comprises a radio frequency circuit portion; and the second circuit portion comprises a baseband circuit portion; wherein the data stream is carried by one or more radio frequency signals that are received by the radio frequency circuit portion; and wherein the radio frequency circuit portion is arranged to convert the one or more radio frequency signals to baseband signals comprising the data stream and to pass samples of said baseband signals to the baseband circuit portion.

Such a radio receiver device may be beneficial for the reception of radio signals complying to various different protocols known in the art per se. However, in a preferred set of such embodiments, the radio frequency signals are LTE signals. When operating in accordance with the LTE specification, the system frequency is dependent on the bandwidth in use, where LTE provides bandwidth options of 1.4, 3, 5, 10, and 20 MHz, having sampling rates and thus system frequencies of 1.92, 3.84, 7.68, 15.36, 23.04, and 30.72 MHz respectively.

In some embodiments, the electronic device is arranged such that, on initialisation, the second counter is set to an initialisation value. This initialisation value may be a default, i.e. predetermined, value. For example, in some embodiments, the initialisation value is zero. In such embodiments, all of the time-stamps will be relative to the time at which the second counter was initialised and thus there will be an offset between the stored time-stamps and the system time.

However, in some alternative embodiments, the initialisation value is set to a system count value on initialisation. This may, by way of example, be achieved using a handshaking procedure. Thus, in accordance with such embodiments, there may be no offset between the stored time-stamps and the system time. Once reception of the samples begins, the second counter is incremented by the increment value for every received sample.

In some embodiments, the second circuit portion is arranged to receive the data stream from the first circuit portion via a synchroniser. This synchroniser acts as a bridge over which data can be passed between the two asynchronous clock domains, i.e. over the asynchronous interface, without the clock domains themselves needing to be synchronised.

While it will be appreciated that there are a number of different types of synchroniser known in the art per se, for example handshaking-based synchronisers or synchronisers that use two or more flip-flops in series. However, in some embodiments, the synchroniser is arranged to receive the samples from the first circuit portion, wherein an input of the synchroniser is clocked by the first clock signal and an output of the synchroniser is clocked by the second clock signal. In some such embodiments the synchroniser comprises a first-in-first-out synchroniser. Those skilled in the art will appreciate that a first-in-first-out (FIFO) synchroniser acts as a buffer where the incoming samples are added to the back of the queue by the first circuit portion at the first clock frequency and are taken from the front of the queue by the second circuit portion at the second clock frequency.

In a set of embodiments, the first and second clock frequencies are equal. In such embodiments, incrementing the count value of the second counter by the increment value, provides a direct correspondence between the first and second counters because they have the same time base. In other words, the time-stamps according to the count value of the second counter directly match the time of the first counter. However, the applicant has appreciated that the two counters could have different time bases and a conversion factor may be used to relate timings in one clock domain to timings in the other clock domain as described hereinabove. Thus, in an alternative set of embodiments, the first clock frequency is different to the second clock frequency.

BRIEF DESCRIPTION OF DRAWINGS

Certain embodiments of the invention will now be described, by way of example only, with reference to the accompanying drawings in which:

FIG. 3 is a timing diagram of the typical operation of the device of FIG. 2.

DETAILED DESCRIPTION

Figure 1:
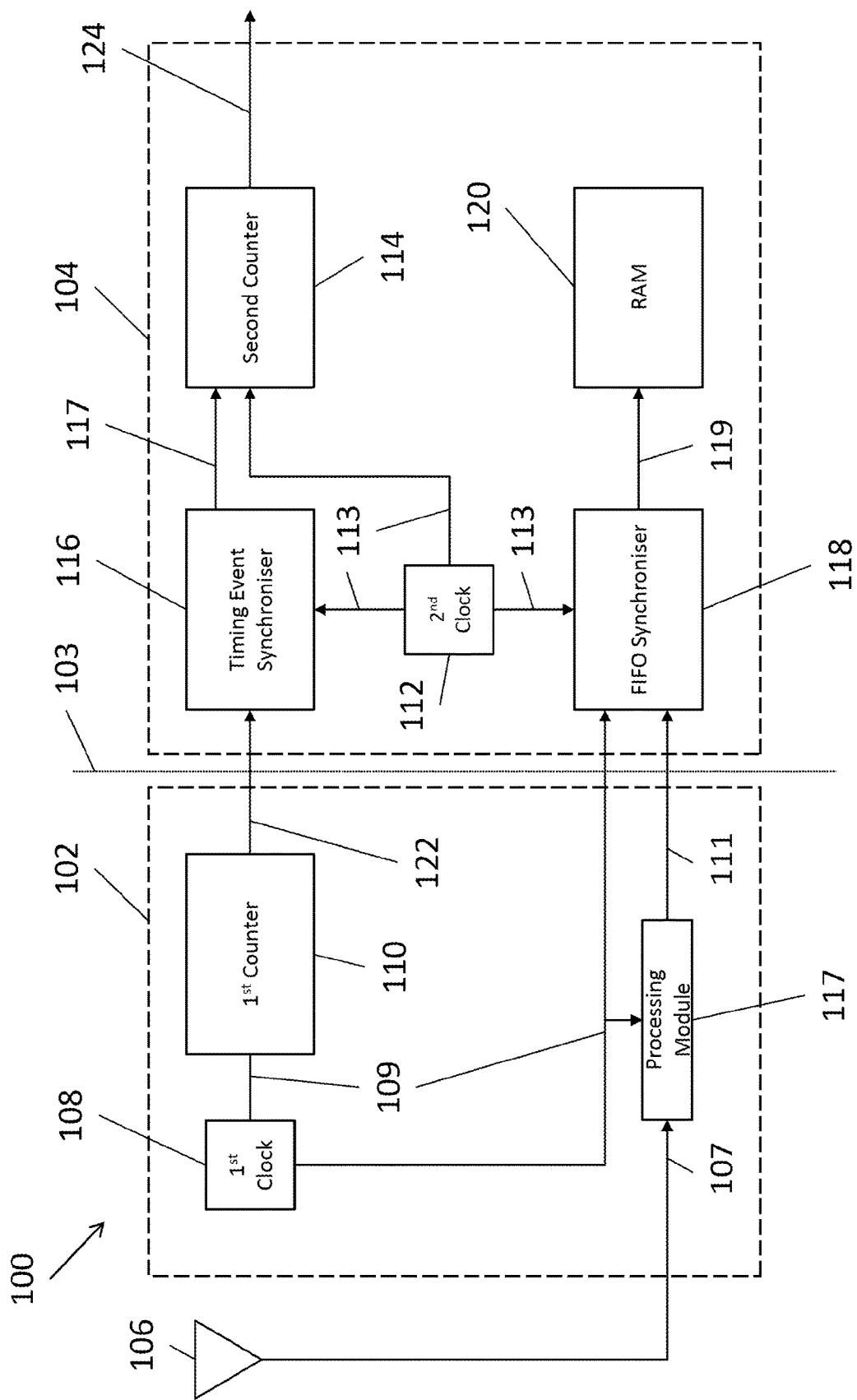
FIG. 1 is a block diagram of a prior art electronic device.

FIG. 1 is a block diagram of a prior art electronic device 100. The device 100 includes a radio frequency (RF) front-end circuit portion 102 and a baseband (BB) circuit portion 104, which are separated by an asynchronous interface 103.

The RF front-end circuit portion 102 is arranged to receive a data stream that is carried by an RF signal 107, which is an LTE signal, that is received via an antenna 106. The LTE signal 107 has a bandwidth selected from the available options of 1.4, 3, 5, 10, 15, and 20 MHz. Depending on which bandwidth is being used by the LTE signal 107, the system frequency is either 1.92, 3.84, 7.68, 15.36, 23.04, and 30.72 MHz respectively.

The RF front-end circuit portion 102 comprises a first clock 108, a processing module 117, and a first counter 110, where the first timer 110 is arranged to keep a reference to the system time that can be used by the RF circuit portion 102. The first timer 110 and the processing module 117 are clocked by a clock signal 109 produced by the first clock 108.

The BB circuit portion 104 comprises a second clock 112, a second counter 114, a timing event synchroniser 116, a first-in-first-out (FIFO) synchroniser 118, and random access memory (RAM) 120. The second counter 114 is arranged to keep a further, independent reference to the system time that can be used by the BB circuit portion 104. A second clock signal 113 produced by the second clock 112 is used to clock both the timing event synchroniser 116 and the FIFO synchroniser 118.

The asynchronous interface 103 arises due to the RF front-end circuit portion 102 and BB circuit portion 104 being in different clock domains, i.e. the first clock 108 and the second clock 112 are not directly related to one another such that there is no fixed phase relationship between the two clock signals 109, 113.

In order to attempt to ensure that both the RF front-end circuit portion 102 and BB circuit portion 104 have the same internal reference to the system time (i.e. the time used by the LTE system), the RF circuit portion 102 is arranged to pass timing event signals 122 to the BB circuit portion 104 via the timing event synchroniser 116. The timing event synchroniser 116 captures the timing event and sets the count value of the counter 114 within the BB circuit portion 104 to the same value as the counter 110 within the RF front-end circuit portion 102.

The processing module 117 is arranged to receive and process the LTE signal 107 in a manner known in the art per se, performing any necessary filtration and amplification. This module 117 includes an analogue-to-digital converter (ADC) that converts the analogue LTE signal 107 to a sampled signal 111 that is input to the FIFO synchroniser 118.

The FIFO synchroniser 118 is clocked by both the first clock signal 109 and the second clock signal 113 and is arranged to receive the sampled LTE signal 111. The FIFO synchroniser 118 acts as a buffer that stores samples of the LTE signal 107 at the write speed, dictated by the first clock signal 109, where the sampled LTE signal 111 is then read and stored into memory 120 as stored signals 119 at the read speed, dictated by the second clock signal 113.

The timing event synchroniser 116 acts like a flip-flop, where the timing event signals 122 from the first timer 110 in the RF front-end circuit portion 102 are latched on rising edges of the second clock signal 113. The timing event synchroniser 116 passes the captured timing events to the second timer 114 as captured timing event signals 117.

However, passing timing event signals 122 over the asynchronous interface 103 introduces uncertainty into timing event signals 124 produced by the second timer 114, which is not desirable.

Figure 2:
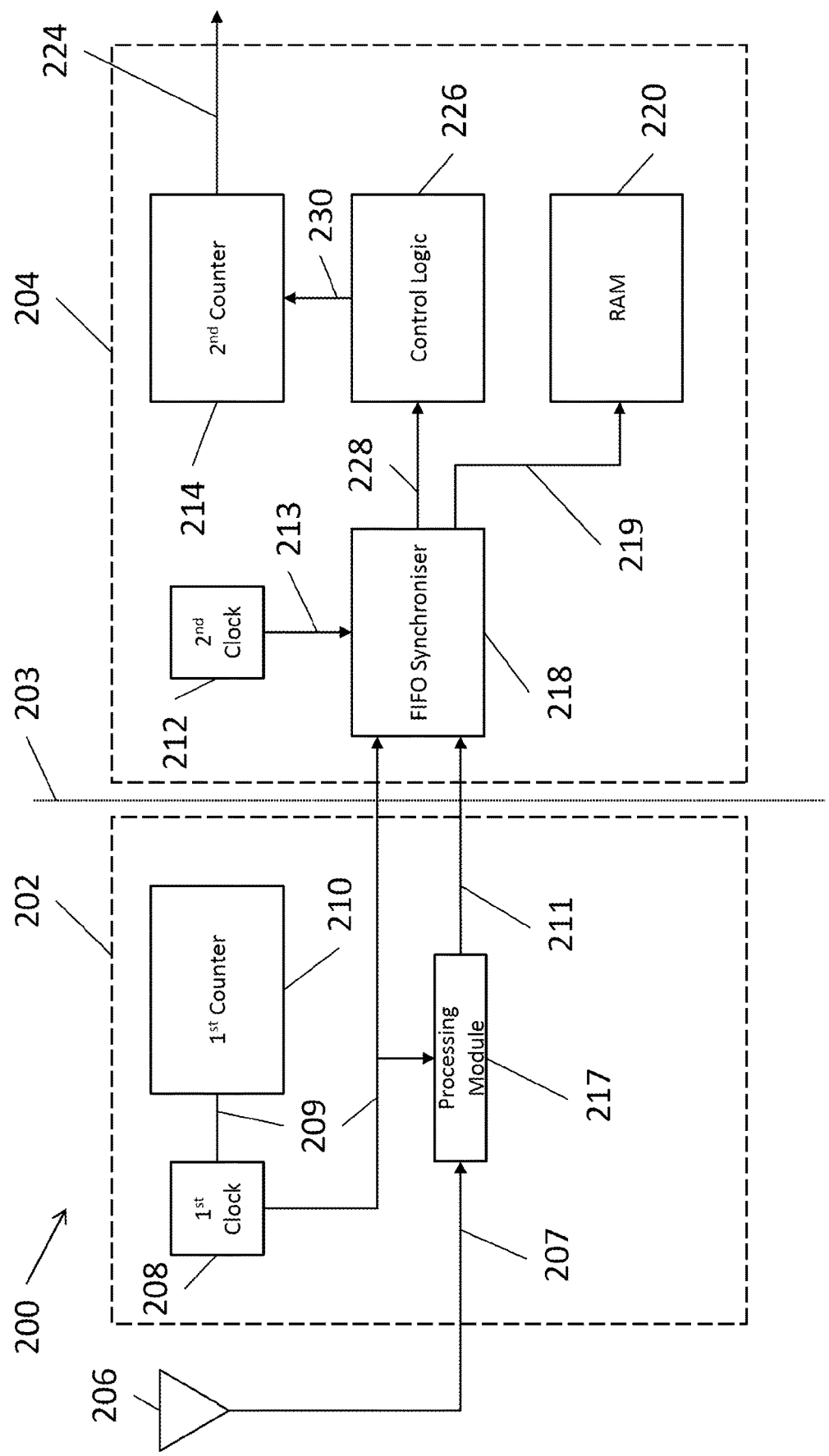
FIG. 2 is a block diagram of a device in accordance with an embodiment of the present invention.

FIG. 2 is a block diagram of a device 200 in accordance with an embodiment of the present invention. The device 200 includes an RF front-end circuit portion 202 and a BB circuit portion 204, which are separated by an asynchronous interface 203. Similarly to the device of FIG. 1, the asynchronous interface 203 arises due to the RF front-end circuit portion 202 and BB circuit portion 204 being in different clock domains, i.e. the first clock 208 and the second clock 212 are not directly related to one another such that there is no fixed phase relationship between the two clock signals 209, 213.

The RF front-end circuit portion 202 is arranged to receive a data stream that is carried by an RF signal 207, which is an LTE signal, that is received via an antenna 206. In this specific embodiment, the LTE signal 207 has a bandwidth of 20 MHz and thus the system frequency is 30.72 MHz respectively. It will, however, be appreciated that this will vary depending on which LTE mode the device 200 is being operated in.

The RF front-end circuit portion 202 comprises a first clock 208, a processing module 217, and a first counter 210, where the first timer 210 is arranged to keep a reference to the system time that can be used by the RF circuit portion 202. The first counter 210 is clocked by a clock signal 209 produced by the first clock 208.

The BB circuit portion 204 comprises a second clock 212, a second counter 214, a first-in-first-out (FIFO) synchroniser 218, RAM 220, and control logic 226. The second counter 214 is arranged to keep a further, independent reference to the system time that can be used by the BB circuit portion 204. Unlike the arrangement described with reference to FIG. 1, in the embodiment of the invention described here, the second counter 214 is not clocked by the clock signal 213 and thus is not free-running. Rather it is incremented in discontinuous jumps as will be described below. The second clock signal 213 is however used to clock the FIFO synchroniser 218 as described below.

The processing module 217 is arranged to receive and process the LTE signal 207 in a manner known in the art per se, performing any necessary filtration and amplification. This module 217 includes an analogue-to-digital converter (ADC) that converts the analogue LTE signal 207 to a sampled signal 211 that is input to the FIFO synchroniser 218. The sampled signal 211 is a digital signal that comprises samples of the LTE signal 207 taken at a sample rate as explained below. It will be appreciated that this processing module 217 will typically contain a number of components necessary for down-converting the incoming LTE signal 207 for use by the BB circuit portion 204, however it is shown as a single block in FIG. 2 for the sake of clarity.

On an abstract level, the FIFO synchroniser 218 can be seen to 'straddle' the clock domains of the RF front-end circuit portion 202 and the BB circuit portion 204, however in this particular embodiment it is physically part of the BB circuit portion 204. It will, of course, be appreciated that the FIFO synchroniser 218 could be synthesised as part of the RF front-end circuit portion 202 instead.

The control logic 226 is arranged to oversee the operation of the second counter 214. On initialisation, e.g. when the device 200 is powered on, the control logic 226 issues a control signal 230 to the second counter 214 that sets its counter value to a default value, in this case to zero. The control logic 226 is also arranged to issue further command signals 230 to the second timer 214 to instruct the counter 214 to increment its count value by a certain increment when incoming samples are received as described below.

While in this particular embodiment the counter value is set to zero on initialisation, alternative embodiments are envisaged wherein the second counter 214 is provided with a value indicative of the system time at the time of initialisation such that any time-stamps based on the counter value of the second counter 214 are absolute (i.e. the time-stamps themselves are indicative of the system time) rather than relative (i.e. the time-stamps are relative to the time at start-up and are offset from the real system time).

In contrast to the device 100 of FIG. 1, the provision of these control signals 230 issued in response to incoming samples of the data stream ensure that the second counter 214 tracks the system time without the need for dedicated timing event signals from the RF circuit portion 202. The control logic 226 instructs the counter 214 to advance its count by the correct amount that corresponds to a given sample within the sampled signal 211 when such samples are received. The receipt of the samples provides the required information about the first clock signal 209.

The FIFO synchroniser 218 is arranged to store the incoming sampled signal 211 into RAM 220 in the same way as described previously with reference to FIG. 1. However, the FIFO synchroniser 218 is also arranged to provide a fill state signal 228 to the control logic 226. This fill state signal 228 indicates to the control logic 226 when the FIFO synchroniser 218 has received a sample.

In this embodiment, the number by which the count value of the second counter 214 is increased corresponds to the number of clock cycles of the first clock signal 209 that take place during a sampling cycle, i.e. it is the ratio between the frequency of the first clock signal 209 and the sample rate used by the BB circuit portion 204, i.e. by the FIFO synchroniser 218.

As explained above, in this example the system frequency is 30.72 MHz. The first clock 208 is arranged such that its clock ratio Z/W is 5/2, i.e. Z=5 and W=2. Thus, in this embodiment, the frequency of the first clock signal 209 is 76.8 MHz (i.e. 30.72 MHz multiplied by 5/2). In this particular example, the second clock 212 is arranged to have the same clock frequency as the first clock 208, however this need not be the case and the frequency of the second clock signal 213 need only be equal to or greater than the sample rate. Thus, advantageously, the frequency of the second clock signal 213 can be freely selected, independently of the frequency of the first clock signal 209.

The sample rate of the sampled signal 211 is K/M times the system frequency where, in this particular embodiment, K=1 and M=16. Accordingly, in this exemplary embodiment, the sample rate is 1.92 MHz (i.e. 30.72 MHz multiplied by 1/16).

It will be appreciated by those skilled in the art that the system frequency term appears in both the calculation of the first clock frequency and the sample rate and thus, when the ratio of these is calculated, the system frequency terms cancel out. Therefore the formula for determining the increment value L by which the second counter 214 needs to be incremented for each incoming sample is thus simplified to L=(Z/W)/(K/M).

In the present embodiment therefore, where Z=5, W=2, K=1, and M=16, the increment value L by which the second counter 214 should be incremented for each incoming sample is L=(5×2)/(1/16)=40. Thus, each time the FIFO synchroniser 218 receives a sample from the data stream, it sets the fill state signal 228 to instruct the control logic 226 that a sample has been received, and the control logic 226 instructs the second counter 214 to increment its count value accordingly (i.e. by forty in this example).

Thus, in this embodiment, the time-stamps assigned to samples using the counter value of the second counter 214 are in the time base of both the RF front-end circuit portion 202 and the BB circuit portion 204 because their frequencies are the same. However, it will be appreciated that, in general, setting Z and W to the values that yield the ratio between the first clock frequency and the system time will provide time-stamps in the time base of the RF front-end circuit portion 202. Conversely, setting Z and W to the values that yield the ratio between the second clock frequency and the system time will provide time-stamps in the time base of the BB circuit portion 204.

FIG. 3 is a timing diagram of the typical operation of the device 200 of FIG. 2. From top-to-bottom, FIG. 3 shows: the local reference to the system time 300 held by the RF front-end circuit portion 202; the count value of the first counter 210; the sample rate 304 used by the RF front-end circuit portion 202; the sample rate 306 of the sampled signal 211; the count value of the second counter 214; and the local reference to the system time 308 held by the BB circuit portion 204.

The local reference to the system time 300 held by the RF front-end circuit portion 202 is a 30.72 MHz signal. As outlined above, the first clock signal 209 is at 5/2 times 30.72 MHz, i.e. it is 76.8 MHz.

In the first sample period s, there are M/K samples (i.e. the inverse of the sample rate K/M, shown on FIG. 3 as samples a to a +(M/K)−1. Accordingly, in the same time period, the first clock signal 209 has L clock pulses, and so the count value of the first counter 210 (which is clocked by the first clock signal 209) is incremented in jumps of one, from n to n+L−1, where L=(Z/W)/(K/M)=40 as outlined above.

Due to propagation delays within the device 200, there is a time delay 310 between the sample period 304 in the RF front-end circuit portion 202 and the sample period 306 in the BB circuit portion 204.

When the BB circuit portion 204 receives a sample from the RF front-end circuit portion 202, e.g. at the end of the first sample period s, the second counter increments its count value by L, i.e. from its current value n to its new value n+L. That sample is then time-stamped with the count n, and the next sample will be time-stamped with the count n+L. Therefore it can be seen that while the timing of the second counter 214 is coarser than that of the first counter 210 (because it does not store count values between n and n+L), its timing accurately follows the timing of the RF front-end circuit portion 202 such that all samples can be time-stamped with the correct time. The timings between n and n+L are not used in the BB circuit portion 204 and thus there is no cost to reducing the resolution of the second counter 214.

Thus it will be appreciated by those skilled in the art that embodiments of the present invention provide an improved electronic device with two asynchronous circuit portions and method of operating the same, where the second circuit portion can maintain certainty over its timing without the need for synchronisation signals from the first circuit portion. Those skilled in the art will appreciate that the specific embodiments described herein are merely exemplary and that many variants within the scope of the invention are envisaged.

The invention claimed is:

1. An electronic device comprising:
a first circuit portion comprising a radio frequency circuit portion, said first circuit portion comprising one or more components, including a first counter, which are clocked by a first clock signal, wherein the first clock signal has a first frequency, said first circuit portion being arranged to receive a data stream comprising a plurality of data signals, wherein the data stream is carried by one or more radio frequency signals that are received by the radio frequency circuit portion; and
a second circuit portion comprising a baseband circuit portion, said second circuit portion comprising one or more components clocked by a second clock signal having a second frequency and a second counter not clocked by the second clock signal, wherein the first clock signal is not synchronised to the second clock signal;
wherein the second circuit portion is arranged to:
receive samples of the data stream from the first circuit portion at a sample rate, wherein the radio frequency circuit portion is arranged to convert the one or more radio frequency signals to baseband signals comprising the data stream and to pass samples of said baseband signals to the baseband circuit portion;
time-stamp each received sample with a count value of the second counter; and
increment the count value of the second counter by a predetermined increment value for each received sample from the data stream.

2. The device as claimed in claim 1, wherein the predetermined increment value is a ratio between the second clock frequency and the sample rate.

3. The device as claimed in claim 2, wherein the ratio is not 1:1.

4. The device as claimed in claim 1, wherein the predetermined increment value is a ratio between the first clock frequency and the sample rate.

5. The device as claimed in claim 4, wherein the ratio is not 1:1.

6. The device as claimed in claim 1, comprising memory having a plurality of memory locations, wherein the second circuit portion is arranged to store each incoming sample from the data stream into the memory such that each sample is stored at the next consecutive memory location.

7. The device as claimed in claim 6, comprising a processing circuit portion that comprises the memory and a processor arranged to access said memory.

8. The device as claimed in claim 1, wherein the radio frequency signals are LTE signals.

9. The device as claimed in claim 1, arranged such that, on initialisation, the second counter is set to an initialisation value.

10. The device as claimed in claim 9, wherein the initialisation value is zero.

11. The device as claimed in claim 9, wherein the initialisation value is set to a system count value on initialisation.

12. The device as claimed in claim 1, wherein the second circuit portion is arranged to receive the data stream from the first circuit portion via a synchroniser.

13. The device as claimed in claim 12, wherein the synchroniser is arranged to receive the samples from the first circuit portion, wherein an input of the synchroniser is clocked by the first clock signal and an output of the synchroniser is clocked by the second clock signal.

14. The device as claimed in claim 13, wherein the synchroniser comprises a first-in-first-out synchroniser.

15. The device as claimed in claim 1, wherein the first and second clock frequencies are equal.

16. The device as claimed in claim 1, wherein the first clock frequency is different to the second clock frequency.

17. A method of operating an electronic device which comprises:
  a first circuit portion comprising a radio frequency circuit portion, said first circuit portion comprising one or more first circuit components, said one or more first circuit components including a first counter; and
  a second circuit portion comprising a baseband circuit portion, said second circuit portion comprising one or more second circuit components and a second counter;
  the method comprising:
  clocking the first circuit components by a first clock signal, wherein the first clock signal has a first frequency,
  clocking the second circuit components but not the second counter by a second clock signal having a second frequency, wherein the first clock signal is not synchronised to the second clock signal;
  said first circuit portion being receiving a data stream comprising a plurality of data signals, wherein said radio frequency circuit portion receives one or more radio frequency signals that carry the data stream;
  said second circuit portion receiving samples of the data stream from the first circuit portion at a sample rate, wherein said radio frequency circuit converts the one or more radio frequency signals to baseband signals comprising the data stream and passes samples of said baseband signals to the baseband circuit portion;
  time-stamping each received sample with a count value of the second counter; and
  incrementing the count value of the second counter by a predetermined increment value for each received sample from the data stream.

18. An electronic device comprising:
  a first circuit portion comprising one or more components, including a first counter, which are clocked by a first clock signal, wherein the first clock signal has a first frequency, said first circuit portion being arranged to receive a data stream comprising a plurality of data signals; and
  a second circuit portion comprising one or more components clocked by a second clock signal having a second frequency and a second counter not clocked by the second clock signal, wherein the first clock signal is not synchronised to the second clock signal;
  wherein the second circuit portion is arranged to:
  receive samples of the data stream from the first circuit portion at a sample rate, wherein the second circuit portion is arranged to receive the data stream from the first circuit portion via a synchroniser;
  time-stamp each received sample with a count value of the second counter; and
  increment the count value of the second counter by a predetermined increment value for each received sample from the data stream;
  wherein the second circuit portion is arranged to receive the data stream from the first circuit portion via a synchroniser; and
  wherein the synchroniser is arranged to receive the samples from the first circuit portion, wherein an input of the synchroniser is clocked by the first clock signal and an output of the synchroniser is clocked by the second clock signal.

19. A method of operating an electronic device which comprises:
  a first circuit portion comprising one or more first circuit components, said one or more first circuit components including a first counter; and
  a second circuit portion comprising one or more second circuit components and a second counter;
  the method comprising:
  clocking the first circuit components by a first clock signal, wherein the first clock signal has a first frequency,
  clocking the second circuit components but not the second counter by a second clock signal having a second frequency, wherein the first clock signal is not synchronised to the second clock signal;
  said first circuit portion being receiving a data stream comprising a plurality of data signals;
  said second circuit portion receiving samples of the data stream from the first circuit portion at a sample rate, wherein the second circuit portion is arranged to receive the data stream from the first circuit portion via a synchroniser;
  time-stamping each received sample with a count value of the second counter; and
  incrementing the count value of the second counter by a predetermined increment value for each received sample from the data stream;
  wherein the second circuit portion is arranged to receive the data stream from the first circuit portion via a synchroniser; and
  wherein the synchroniser is arranged to receive the samples from the first circuit portion, wherein an input of the synchroniser is clocked by the first clock signal and an output of the synchroniser is clocked by the second clock signal.

* * * * *